United States Patent
Hsueh

(10) Patent No.: US 11,096,089 B2
(45) Date of Patent: Aug. 17, 2021

(54) DATA PACKAGING METHOD AND COMMUNICATION DEVICE

(71) Applicant: MEDIATEK INC., Hsin-Chu (TW)

(72) Inventor: Jen-Hao Hsueh, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/519,000

(22) Filed: Jul. 23, 2019

(65) Prior Publication Data

US 2020/0068436 A1    Feb. 27, 2020

Related U.S. Application Data

(60) Provisional application No. 62/720,165, filed on Aug. 21, 2018.

(51) Int. Cl.
*H04W 28/06* (2009.01)
*H04L 1/18* (2006.01)

(52) U.S. Cl.
CPC .......... *H04W 28/065* (2013.01); *H04L 1/18* (2013.01)

(58) Field of Classification Search
CPC ....... H04L 1/18; H04L 1/1861; H04L 1/1812; H04L 1/08; H04L 1/887; H04W 28/065; H04W 80/02; H04W 72/08; H04W 72/02; H04W 74/08; H04W 28/0294; H04W 28/06
USPC ........................................................ 370/328
See application file for complete search history.

(56) References Cited

U.S. PATENT DOCUMENTS

| | | | | |
|---|---|---|---|---|
| 8,488,540 B2 * | 7/2013 | Yi | .......... | H04W 72/10 370/329 |
| 9,042,320 B2 * | 5/2015 | Kim | .......... | H04W 28/0278 370/329 |
| 9,210,717 B2 * | 12/2015 | Nguyen | .......... | H04W 72/02 |
| 10,341,055 B2 * | 7/2019 | Yi | .......... | H04W 76/27 |
| 10,455,551 B2 * | 10/2019 | Jang | .......... | H04W 72/0406 |
| 10,470,210 B2 * | 11/2019 | Yi | .......... | H04W 74/08 |
| 10,555,326 B2 * | 2/2020 | Yi | .......... | H04L 5/001 |
| 10,602,529 B2 * | 3/2020 | Babaei | .......... | H04W 72/087 |
| 10,660,086 B2 * | 5/2020 | Kim | .......... | H04L 5/0007 |

(Continued)

FOREIGN PATENT DOCUMENTS

| | | |
|---|---|---|
| TW | 201719442 A | 6/2017 |
| TW | 201735673 A | 10/2017 |
| WO | 2018/135874 A1 | 7/2018 |

*Primary Examiner* — Man U Phan
(74) *Attorney, Agent, or Firm* — Winston Hsu

(57) ABSTRACT

A data packaging method applied in a communication device is disclosed The method includes: transmitting a plurality of first data packets including a plurality of first data contents; storing the plurality of first data contents; obtaining allocated resources for a second data packet; inserting a second data content into the second data packet; determining whether any resources remain in the second data packet after the second data content is inserted into the second data packet; selecting a portion among the plurality of first data contents in response to any resources remaining in the second data packet after the second data content is inserted into the second data packet; inserting the selected portion into the second data packet; and transmitting the second data packet including the second data content and the selected portion; wherein the plurality of first data packets are transmitted previous to the second data packet.

12 Claims, 5 Drawing Sheets

(56) References Cited

U.S. PATENT DOCUMENTS

2019/0281655 A1\* 9/2019 Kim ..................... H04L 1/1848
2019/0335361 A1\* 10/2019 Lee ..................... H04W 28/065
2020/0053715 A1\* 2/2020 Jang ..................... H04L 5/0053
2020/0137776 A1\* 4/2020 Lee ..................... H04W 48/14

\* cited by examiner

DATA PACKAGING METHOD AND COMMUNICATION DEVICE

CROSS REFERENCE TO RELATED APPLICATIONS

This application claims the benefit of U.S. provisional application No. 62/720,165, filed on Aug. 21, 2018, which is incorporated herein by reference.

BACKGROUND

The present application relates to a data packaging method and a communication device, and more particularly, to a data packaging method and a communication device capable of reducing latency without using extra network resource.

ARQ (Automatic Repeat-reQuest) is a well-developed mechanism in the data link layer (Layer 2) to guarantee the integrity of data transmission, realized in the RLC sub-layer in an LTE system. Once an RLC entity at a receiving end reorders its received packets and finds out some packet is missing, the RLC entity would request the transmitting end to re-transmit the missing packets, and the transmitting end would re-transmit the missing packet after receiving the re-transmission request.

However, ARQ induces additional latency. For non-real time service, such as HTTP or FTP, the latency may not be an issue. But for real time service, such as online gaming or VoLTE, it is very sensitive to latency, and the missing packets are usually dropped in these latency-sensitive real-time applications, which would degrade the performance (integrity) of data transmission.

Therefore, it is necessary to improve the prior art.

SUMMARY

It is therefore a primary objective of the present application to provide a data packaging method and a communication device, capable of reducing latency without using extra network resource, to improve over disadvantages of the prior art.

An embodiment of the present application discloses a data packaging method applied in a communication device, comprising: transmitting a plurality of first data packets including a plurality of first data contents; storing the plurality of first data contents; obtaining allocated resources for a second data packet; inserting a second data content into the second data packet; determining whether any resources remain in the second data packet after the second data content is inserted into the second data packet; selecting a portion from the plurality of first data contents in response to any resources remaining in the second data packet after the second data content is inserted into the second data packet; inserting the selected portion into the second data packet; and transmitting the second data packet including the second data content and the selected portion; wherein the plurality of first data packets are transmitted previous to the second data packet.

An embodiment of the present application discloses a communication device, comprising: a buffer; a processing circuit; a storage circuit, configured to store a program code 140, to instruct the processing circuit to perform transmitting a plurality of first data packets including a plurality of first data contents; storing the plurality of first data contents in the buffer; obtaining allocated resources for a second data packet; inserting a second data content into the second data packet; determining whether any resources remain in the second data packet after the second data content is inserted into the second data packet; selecting a portion from the plurality of first data contents from the buffer in response to any resources remaining in the second data packet after the second data content is inserted into the second data packet; inserting the selected portion into the second data packet; and transmitting the second data packet including the second data content and the selected portion; wherein the plurality of first data packets are transmitted previous to the second data packet.

These and other objectives of the present invention will no doubt become obvious to those of ordinary skill in the art after reading the following detailed description of the preferred embodiment that is illustrated in the various figures and drawings.

DETAILED DESCRIPTION

Abbreviations are listed as below, applied to all of the description, claims and figures of the present application.
ACK Acknowledgement
ARQ Automatic Repeat-reQuest
ASIC Application-specific integrated circuit
eNB Evolved Node B
gNB Next Generation Node B
LTE Long Term Evolution
MAC Medium Access Control
NVM Non-Volatile Memory
PDU Protocol Data Unit
RAM Random Access Memory
RLC Radio Link Control
ROM Read Only Memory
SDU Service Data Unit
SN Sequence Number
SoC System on Chip
UE User Equipment
UL Uplink
VoLTE Voice over LTE ARQ, a mechanism to guarantee integrity of data transmission, induces extra latency. Furthermore, data retransmission, requested by the ARQ mechanism, would require extra network resource which is limited and shared by all users on that particular eNB.

Compared to the reactive data retransmission, in the present application, data retransmission is proactively performed, and the latency caused by the ARQ is expected to be reduced. In addition, the proactive data retransmission is performed by using the remaining resource/field within a MAC PDU, where padding is usually placed in the art. In other words, instead of placing padding in the remaining field within a MAC PDU (as the prior art does), the present application proactively retransmits data using the remaining field, without utilizing extra network resource.

Figure 1:
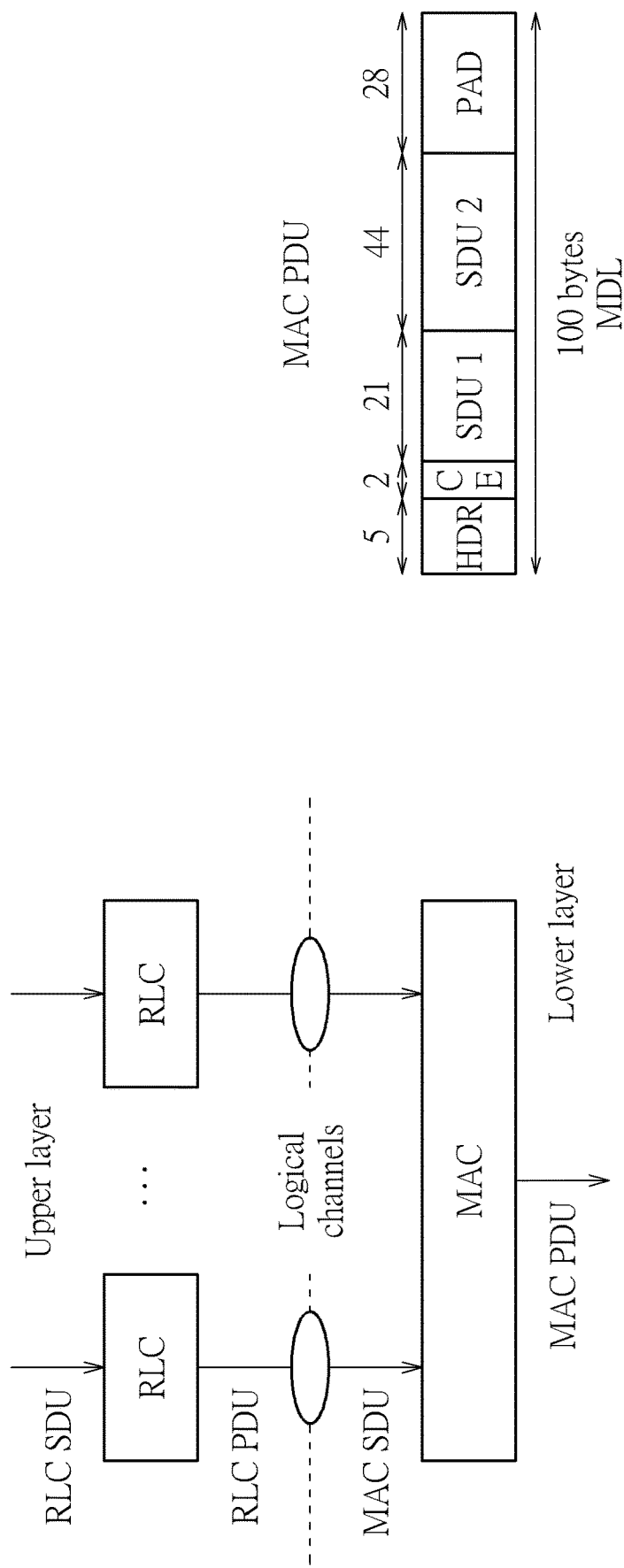
FIG. 1 illustrates an interaction between an RLC layer and a MAC layer, and a frame structure of a MAC PDU in the art.

FIG. 1 illustrates an interaction between an RLC layer and a MAC layer, and a frame structure of a MAC PDU in the art. From the left part of FIG. 1, the RLC layer (consisting of one or multiple RLC entities) may receive RLC SDUs from an upper layer and deliver RLC PDUs, to the MAC layer (or the MAC entity). Through the logical channels, the MAC layer receives MAC SDUs, so as to pack the MAC SDUs into MAC PDUs, and delivers the MAC PDUs to a lower layer (e.g., the physical (PHY) layer). From the right part of FIG. 1, a MAC PDU is generated based on a maximum data length MDL. The MAC PDU may comprise a MAC header HDR, none or a few MAC control elements CE, and none or a few MAC SDUs. In the embodiment illustrated in FIG. 1, the maximum data length MDL is 100 Bytes, and the header HDR occupies 5 Bytes, the control element CE occupies 2 Bytes, a first SDU (annotated as SDU1) occupies 21 Bytes and a second SDU (annotated as SDU2) occupies 44 Bytes. After HDR, CE, SDU1 and SDU2 are packaged/packed into the MAC PDU, if there is no other MAC SDU to be transmitted and there is still remaining resource/field, the MAC PDU would be padded to fulfill the maximum data length MDL. The padding, occupying 28 Bytes in the embodiment shown in FIG. 1 (annotated as PAD), would eventually be discarded at the destination device.

Note that, the padding placed in the remaining field is only to fulfill the maximum data length MDL but contribute nothing to the network data transmission. In order to reduce latency induced by ARQ, a fundamental concept of the present application is to transmit a previously transmitted/packaged data content, which has been transmitted/packaged within a previous MAC PDU, by using the remaining field within the current MAC PDU, where the data content may be referred to MAC SDU or RLC PDU. In this case, data retransmission is performed in a proactive sense without using extra network resource, so the network resource utilization can be effectively improved.

Figure 2:
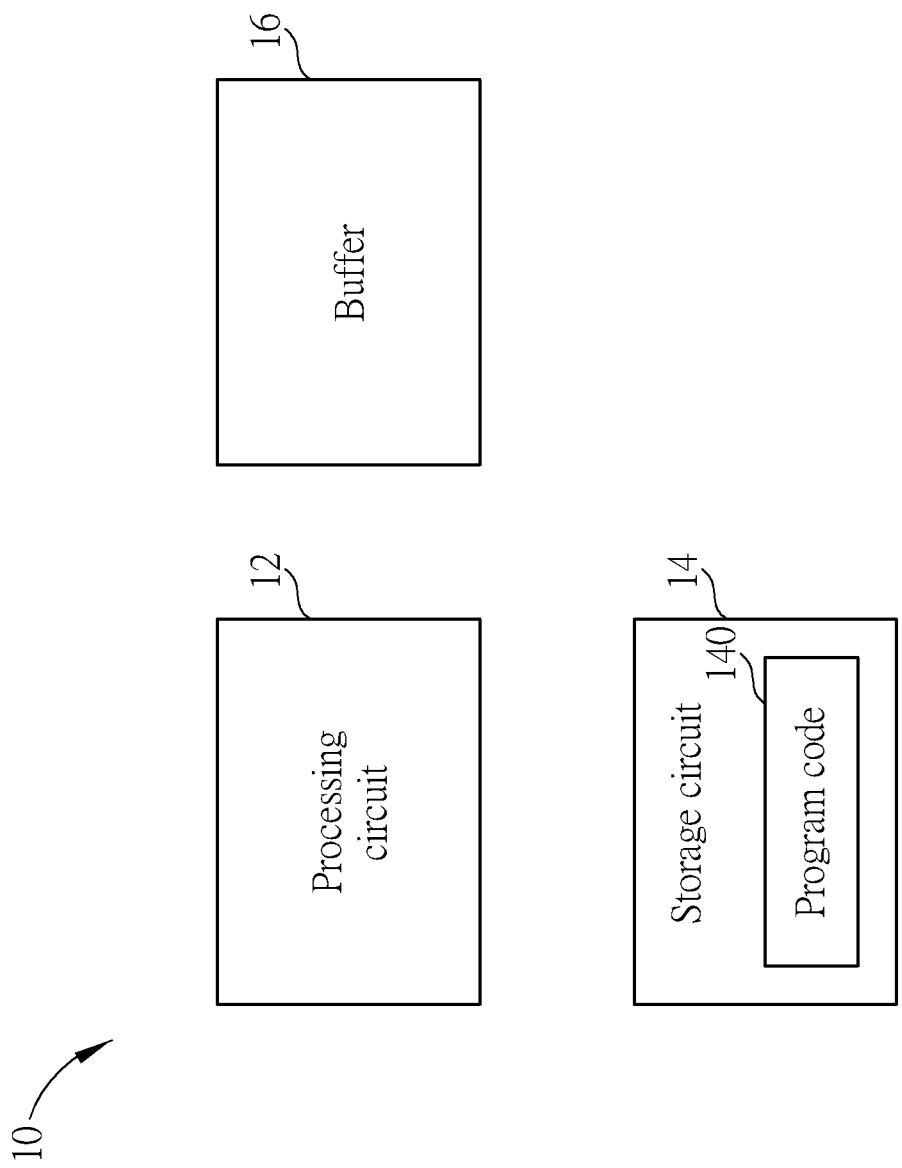
FIG. 2 is a schematic diagram of a communication device according to an embodiment of the present application.

The concept stated in the above may be realized in a communication device. FIG. 2 is a schematic diagram of a communication device 10 according to an embodiment of the present application. In an embodiment, the communication device 10 may operate in a communication system and communicate with its counterpart (communication) device, where the communication system may be an LTE or an LTE-oriented system. The communication device may be referred to an UE, which may be a phone, a tablet computer, or the like. In this case, the counterpart (communication) device may be a station (e.g., a micro base station or a femto base station) or, equivalently, a Node B (e.g., an eNB or a gNB).

Figure 3:
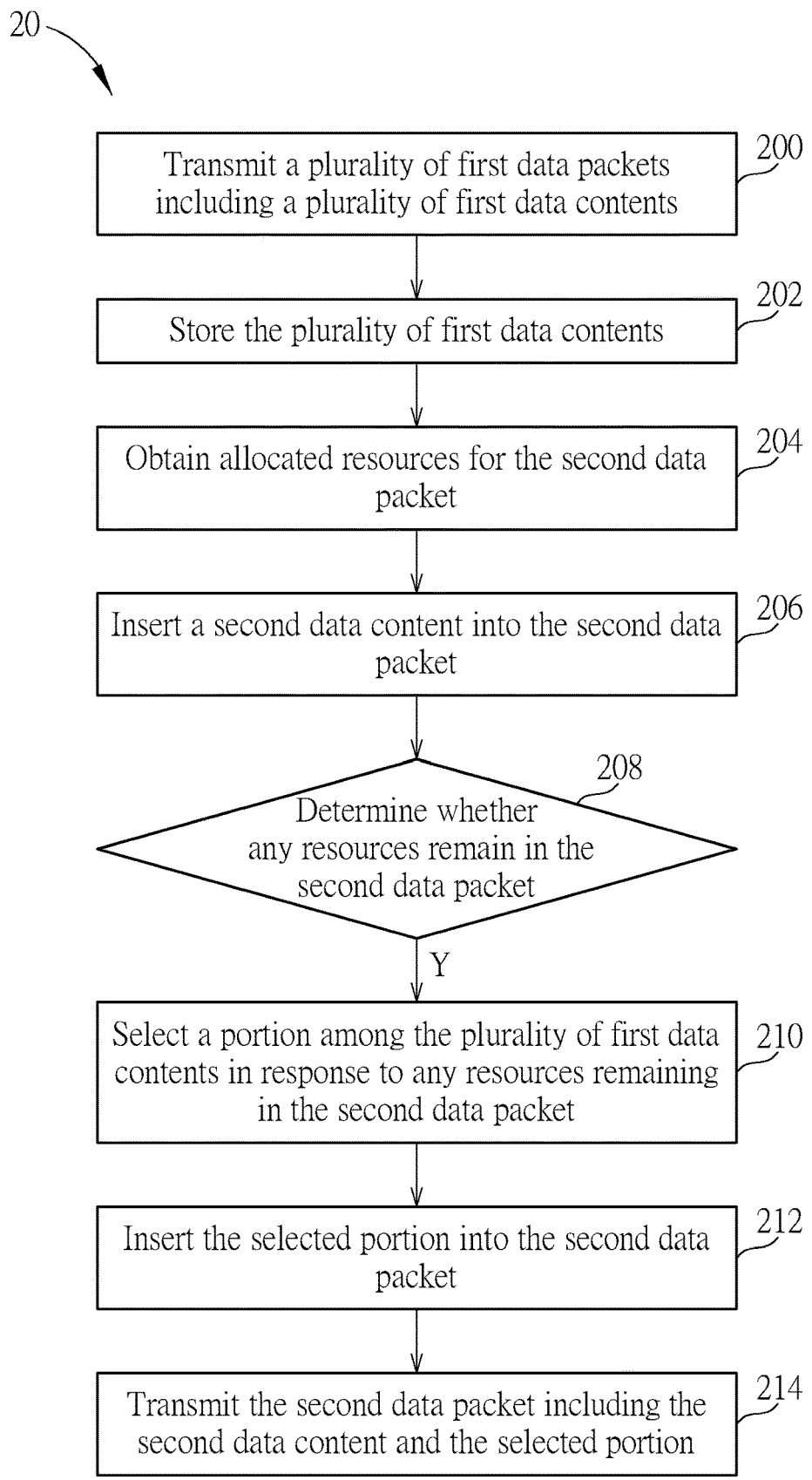
FIG. 3 is a schematic diagram of a data packaging process according to an embodiment of the present application.

The communication device 10 comprises a processing circuit 12, a storage circuit 14 and a buffer 16. The communication device 10 may be an ASIC or a SoC chip. The buffer 16 may be a volatile memory, e.g., a RAM, configured to store previously transmitted/packaged data, e.g., previously transmitted/packaged MAC SDU. The storage circuit 14 may be an NVM, e.g., a ROM or a flash memory, configured to store a program code 140, to instruct the processing circuit 12 to perform a data packaging process 20, i.e., the data packaging process 20 may be compiled as the program code 140. The data packaging process 20 is illustrated in FIG. 3 and specifies a process of generating a current data packet $DP_n$, a data packet DP corresponding to a time (or time index) n. The data packet DP may be referred to, e.g., a MAC PDU.

In FIG. 3, the processing circuit 12 transmits a plurality of first/previous data packets $DP_{n-K}, \ldots, DP_{n-1}$ (Step 200), where the first/previous data packets $DP_{n-K}, \ldots, DP_{n-1}$ include a plurality of first/previous data contents $DNC_{n-K}, \ldots, DNC_{n-1}$, respectively. The processing circuit 12 stores the plurality of first/previous data contents $DNC_{n-K}, \ldots, DNC_{n-1}$ in the buffer 16 (Step 202). The processing circuit 12 obtains allocated resources for the second/current data packet $DP_n$ (Step 204). The processing circuit 12 inserts a second/current data content $DNC_n$ into the second/current data packet $DP_n$ (Step 206). After the second/current data content $DNC_n$ is inserted into the second/current data packet $DP_n$, the processing circuit 12 determines whether any resources remain in the second/current data packet $DP_n$ (Step 208). If yes, the processing circuit 12 selects a portion SP from the plurality of first/previous data contents $DNC_{n-K}, \ldots, DNC_{n-1}$, in response to any resources remaining in the second/current data packet $DP_n$ (Step 210). Then, the processing circuit 12 inserts the selected portion SP into the second/current data packet $DP_n$ (Step 212) and transmits the second/current data packet DP including the second/current data content $DNC_n$ and the selected portion SP (Step 214).

In step 200, the previous data packets $DP_{n-K}, \ldots, DP_{n-1}$, corresponding to time indices (n−K), . . . , (n−1), respectively, are data packets (e.g., MAC PDUs) transmitted prior to the current (second) data packet $DP_n$. The description of "the transmitted data packet" in the process 20 may be referred to "the packaged data packet which is delivered to the lower layer". The data contents $DNC_{n-K}, \ldots, DNC_{n-1}$, which may be referred to MAC SDUs or RLC PDUs, are inserted in the previous data packets $DP_{n-K}, \ldots, DP_{n-1}$. Note that, the time indices (n−K), . . . , (n−1) are referred to times prior to the time index n, and the times (n−K), . . . , n are not necessary equally and temporally spaced.

In Step 202, the plurality of previous data contents $DNC_{n-K}, \ldots, DNC_{n-1}$ is stored in the buffer 16. In an embodiment, each of the previous data contents $DNC_{n-K}, \ldots, DNC_{n-1}$ may comprise a plurality of data units already transmitted (or delivered) to the lower layer. In the present application, data unit may be referred to, for example, MAC SDU or RLC PDU.

In Step 204, the processing circuit 12 obtains allocated resources for the current data packet $DP_n$. The allocated resources may be referred to, for example, a maximum data amount or the maximum data length MDL which can be carried by the current data packet $DP_n$. For the communication device 10 being the UE, the processing circuit 12 may receive the maximum data length MDL from, e.g., an UL grant provided by the eNB or gNB.

In Step 206, the processing circuit 12 inserts the current data content $DNC_n$ into the current data packet $DP_n$. In an embodiment, the processing circuit 12 may, but not limited to, perform a logical channel prioritization (LCP) operation, to obtain the current data content $DNC_n$, where the LCP operation may be referred to a MAC specification, e.g., 3GPP TS 36.321. According to 3GPP TS 36.321, the LCP operation would be performed until data for the logic channels are completely served or the UL grant is exhausted, whichever comes first. In other words, in Step 206, the processing circuit 12 would insert MAC SDUs until there is no MAC SDU to be served or no remaining resources in the current data packet $DP_n$.

After the current data content $DNC_n$ is inserted into the current data packet $DP_n$, e.g., by performing the LCP operation, in Step 208, the processing circuit 12 would determine whether any resources remain for the current data packet $DP_n$. In an embodiment, the processing circuit 12 may determine whether the data length of the current data content $DNC_n$ plus the MAC header HDR and the MAC control elements CE is less than the maximum data length MDL. If yes (the data length of the current data content $DNC_n$ plus the MAC header HDR and the MAC control elements CE is less than the maximum data length MDL), the processing circuit 12 would determine there are resources remaining in the current data packet $DP_n$ and go to Step 210. For example, for the MAC PDU illustrated in FIG. 1, the processing circuit 12 would obtain a data length of the MAC header HDR, the MAC control elements CE and the (current) data content to be 72 (=5+2+21+44) Bytes, which is less than 100 Bytes, the maximum data length MDL of the MAC PDU in FIG. 1. It means that there are resources remaining in the MAC PDU in FIG. 1. Hence, for the case of the MAC PDU illustrated in FIG. 1, the processing circuit 12 would go to execute Step 210.

When the processing circuit 12 determines that there are resources remaining within the current data packet $DP_n$, in Step 210, the processing circuit 12 would select a portion SP from the data contents $DNC_{n-K}$, ..., $DNC_{n-1}$. In an embodiment, the processing circuit 12 may select a portion SP which has not been acknowledged in terms of ARQ, i.e., the processing circuit 12 may select a portion SP based on the data units in $DNC_{n-K}$, ..., $DNC_{n-1}$ which have not been acknowledged, since retransmitting a data unit which has been acknowledged may have no practical improvement. In an embodiment, whether or not a data unit is acknowledged relies on whether or not the communication device 10 receives a positive acknowledgment for that particular data unit.

Preferably, the processing circuit 12 may select a portion SP such that the selected portion SP comprises (a whole or a part of) the earliest data unit which has not been acknowledged. The earliest data unit which has not been acknowledged is referred to a data unit which has not been acknowledged, within the TX window of an RLC entity (which may include the program code 140) of the communication device 10, corresponding to the smallest RLC SN. The rationale behind is that an RLC entity at the counterpart communication device (e.g., eNB) would reorder (i.e., arrange to be in order) its received packets (according to SN) and check if any packet is lost, and it is reasonable for the communication device 10 to retransmit the earliest data unit which has not been acknowledged as soon as possible, to prevent a request for retransmission from being initiated (due to ARQ).

In another perspective, it can be regarded that the data contents $DNC_{n-K}$, ..., $DNC_{n-1}$ may comprise one or more data units which have not been acknowledged, among which the processing circuit 12 may select the earliest data unit to be the portion SP. As mentioned earlier, the selected portion SP may be either an entire of the earliest data unit or a segment of the earliest data unit, depending on the size (i.e., data length) of the remaining resources within the current data packet $DP_n$. The segment of the earliest data unit may be a beginning segment, a middle segment or an ending segment of the earliest data unit.

In Step 212, the processing circuit 12 may insert the selected portion SP behind the second/current data content $DNC_n$ within the second/current data packet $DP_n$. In an embodiment, the current data content $DNC_n$ and the selected portion SP may fully occupy the current data packet $DP_n$, in which there is no padding at all.

In Step 212, the processing circuit 12 may transmit (or deliver) the second/current data packet $DP_n$ comprising the second/current data content $DNC_n$ and the selected portion SP to the lower layer.

Back to Step 210, details of how to select a data unit is not limited. In an embodiment, state variables VT(A) and VT(S), specified in 3GPP TS 36.322 (RLC protocol specification for LTE), may be exploited to determine which data unit is the earliest one that has not been acknowledged. The state variable VT(A) represents the first RLC SN waiting for acknowledgement, and the state variable VT(S) represents the next RLC SN to be assigned to a new data unit. A state variable VT(F) may be introduced to represent the next RLC SN for which a corresponding data unit is to be selected in the next execution of Step 210.

Figure 4:
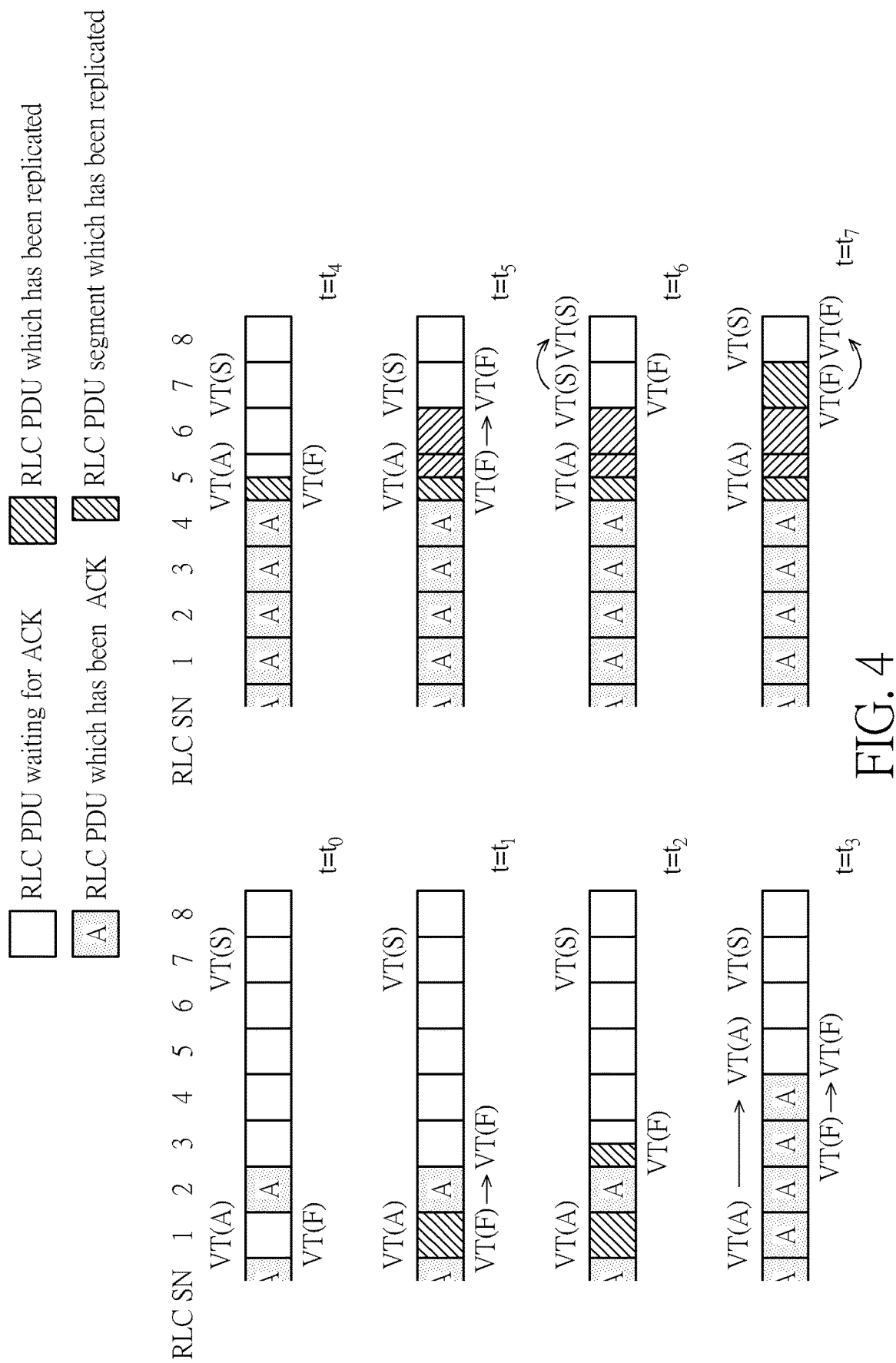
FIG. 4 illustrates a schematic diagram of operations of selecting a portion for a current data packet according to an embodiment of the present application.

FIG. 4 illustrates a series of operations of selecting the portion SP for the data packets $DP_n$, ..., $DP_{n+5}$, assuming that there are resources remaining after the data contents $DNC_n$, ..., $DNC_{n+5}$ are inserted, respectively.

In FIG. 4, white squares with SN less than VT(S) represent RLC PDUs waiting for acknowledgement. Frankly speaking, these white squares represent data units which have not been acknowledged. Squares with dotted-shadow and a letter "A" therein represent RLC PDUs which have been acknowledged. Squares with slashes (either forward slashes or backward slashes) represent RLC PDUs which have been replicated to the remaining field of a MAC PDU, and gray rectangles with slashes are segments of RLC PDUs which have been replicated to the remaining field of a MAC PDU.

At a time $t=t_0$, the state variables VT(A) and VT(F) are VT(F)=VT(A)=1. During the time interval between the times $t_0$ and $t_1$, the RLC PDU corresponding to SN=1 is replicated to the remaining resource of the current data packet $DP_n$, such that the RLC PDU corresponding to SN=1 is grayed and slashed at $t=t_1$, and the state variable VT(F) becomes VT(F)=3, as the RLC PDU corresponding to SN=2 has been acknowledged. During the time interval between the times $t_1$ and $t_2$, a segment of the RLC PDU corresponding to SN=3 is replicated to the remaining resource of the current data packet $DP_{n+1}$, and the state variable VT(F) remains as VT(F)=3.

During the time interval between the times $t_2$ and $t_3$, the communication device 10 receives acknowledgment for the RLC PDUs with SN=1, SN=3 and SN=4. At $t=t_3$, the state variables VT(A) and VT(F) become VT(F)=VT(A)=5.

During the time interval between the times $t_3$ and $t_4$, a first (beginning) segment of the RLC PDU corresponding to SN=5 is replicated to the remaining resource of the current data packet $DP_{n+2}$. During the time interval between the times $t_4$ and $t_5$, a second (ending) segment of the RLC PDU corresponding to SN=5 and the RLC PDU corresponding to SN=6 are replicated to the remaining resource of the current data packet $DP_{n+3}$. At $t=t_5$, the state variable VT(F) becomes VT(F)=7.

During the time interval between the times $t_5$ and $t_6$, the current data packet $DP_{n+4}$ carrying a new RLC PDU corresponding to SN=7 is transmitted. At $t=t_6$, the state variable VT(S) becomes VT(S)=8. During the time interval between the times $t_6$ and $t_7$, the RLC PDU corresponding to SN=7 is replicated to the remaining resource of the current data packet $DP_{n+5}$. At $t=t_7$, the state variable VT(F) becomes VT(F)=8.

Figure 5:
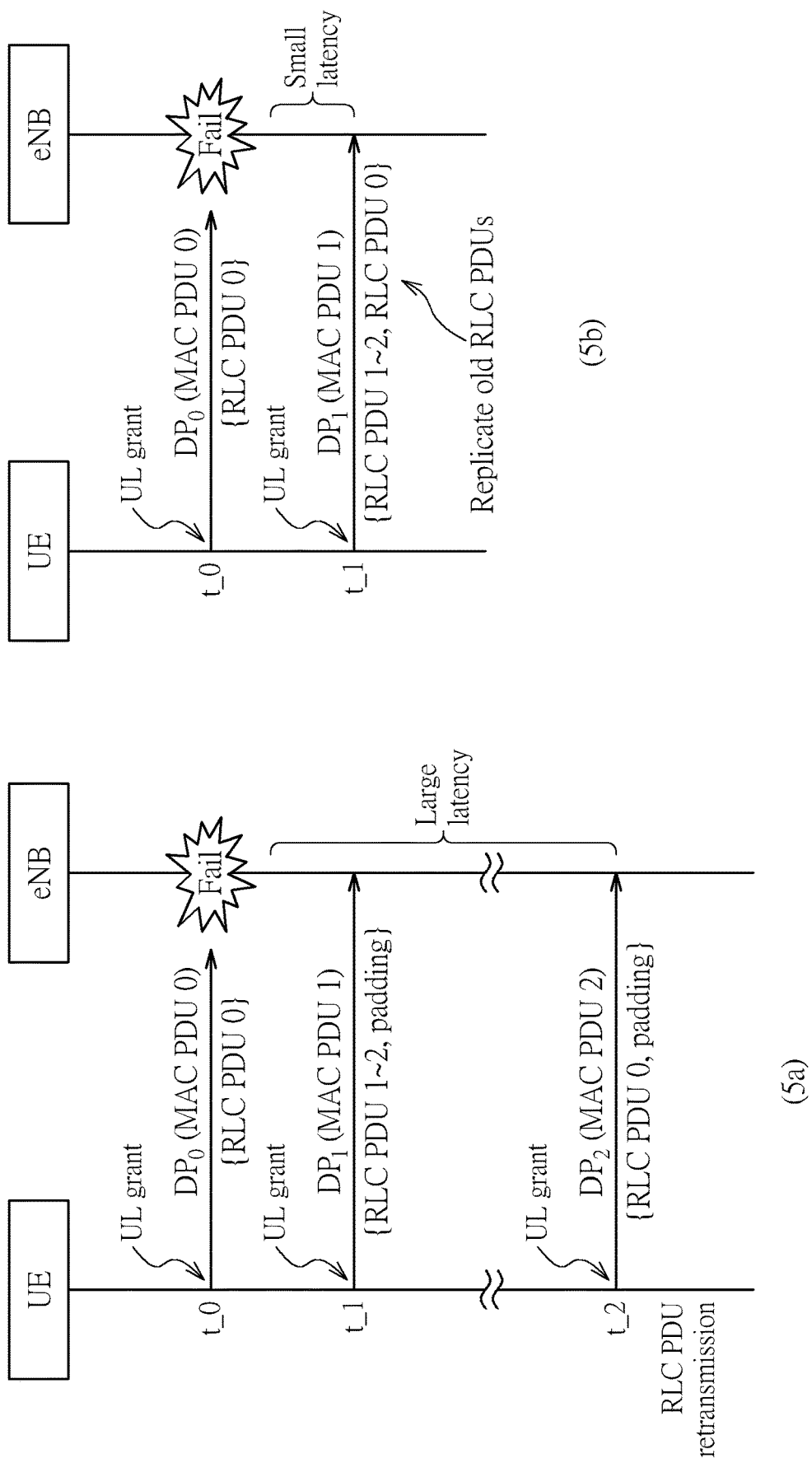
FIG. 5 illustrates schematic diagrams of timing procedures of reactive and proactive data retransmission.

The effect of latency reduction can be visualized in FIG. 5. In FIG. 5a, a UE transmits the data packets $DP_0$ and $DP_1$ at times t_0 and t_1, respectively, where the data packets $DP_0$ and $DP_1$ may be MAC PDU indexed by time indices 0 and 1. The data packet $DP_0$ carries an RLC PDU indexed by SN=0 (hereinafter, "the RLC PDU 0"). The data packet $DP_1$ carries RLC PDUs indexed by SN=1 and SN=2 (hereinafter, "RLC PDU 1~2") and fulfilled by the padding. In a case that the RLC PDU 0 is found missed, the corresponding eNB would request the UE to retransmit the RLC PDU 0. The UE would then transmit the data packets $DP_2$ (indexed by a time index 2) containing the RLC PDU 0, reactively, at a time t_2. The scheme illustrated in FIG. 5a causes a large latency, without mentioning that the eNB can only find out the RLC PDU 0 is lost after the eNB receives the RLC PDU 1, a factor enlarging the latency. For instance, the large latency in FIG. 5a may be in a scale of 100 milliseconds (ms).

In comparison, in FIG. 5b, where the UE may be realized by the communication device 10, before/without receiving a negative acknowledgement corresponding to the RLC PDU 0, the UE (or the device 10) can proactively retransmit the unacknowledged RLC PDU 0, using the remaining resource within the data packet $DP_1$, instead of inserting the padding. Since the unacknowledged RLC PDU 0 is proactively retransmitted, the eNB does not have to wait for the RLC PDU 1 to recognize that the RLC PDU 0 is missed, and the latency is significantly reduced. For instance, the small latency in FIG. 5b may be in 3~5 ms.

By the way, for the scheme illustrated in FIG. 5b, if the communication device 10 receives a retransmission request regarding the RLC PDU 0 within a short period after t_1, the time the communication device 10 proactively retransmits the RLC PDU 0, the communication device 10 may choose to ignore the retransmission request regarding the RLC PDU 0. In other words, given that the communication device 10 already retransmits the RLC PDU 0 at the time t_1, if the communication device 10 receives a retransmission request regarding the RLC PDU 0 at a time (t_1+Δ), and the processing circuit 12 determines that Δ is less than a certain threshold, e.g., 10 ms, the communication device 10 may choose not to retransmit the RLC PDU 0 in response to this retransmission request regarding the RLC PDU 0.

Notably, the embodiments stated in the above are utilized for illustrating the concept of the present application. Those skilled in the art may make modifications and alterations accordingly, and not limited herein. For example, in Step 210, the processing circuit 12 does not have to select the earliest unacknowledged data unit for the portion SP. For example, the processing circuit 12 may select the latest transmitted data unit, or randomly select an unacknowledged data unit from the data contents $DNC_{n-K}, \ldots, DNC_{n-1}$, for the portion SP. As long as the selected portion SP contains a part of data unit which has been transmitted and not yet acknowledged, the requirement of the present application is satisfied.

In addition, the selected portion SP may contain data unit corresponding to either user-plane data or control-plane signaling. That is, the selected portion SP may include either a user-plane data unit (abbreviated as user data unit) or a control-plane data unit (abbreviated as control data unit), or both.

In an embodiment, the program code 140 may be included in the MAC entity of the communication device 10. In another embodiment, the program code 140 may be included in the RLC entity of the communication device 10.

In summary, the present application proactively retransmits the unacknowledged data unit using the remaining resource within the current data packet, so as to reduce latency, without utilizing extra network resource.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data packaging method, applied in a communication device, comprising:
   transmitting a plurality of first medium access control (MAC) protocol data units (PDUs) including a plurality of first radio link control (RLC) PDUs;
   storing the plurality of first RLC PDUs;
   obtaining allocated resources for a second MAC PDU;
   inserting at least one second RLC PDU into the second MAC PDU based on a logical channel prioritization operation;
   determining whether any resources remain in the second MAC PDU after the at least one second RLC PDU is inserted into the second MAC PDU based on the logical channel prioritization operation;
   selecting a portion from the plurality of first RLC PDUs which are previously transmitted and inserting the selected portion into the second MAC PDU in response to any resources remaining in the second MAC PDU, after the at least one second RLC PDU is inserted into the second MAC PDU based on the logical channel prioritization operation; and
   transmitting the second MAC PDU including the at least one second RLC PDU and the selected portion inserted behind the at least one second RLC PDU.

2. The data packaging method of claim 1, wherein the selecting the portion from the plurality of first RLC PDUs comprises:
   selecting the portion based on whether the portion is acknowledged.

3. The data packaging method of claim 1, wherein the plurality of first RLC PDUs includes one or more unacknowledged data units, and the step of selecting the portion of the first RLC PDUs comprises:
   selecting an earliest data unit from the one or more unacknowledged data units.

4. The data packaging method of claim 1, further comprising:
   receiving a retransmission request regarding the selected portion;
   determining a difference between a first time of receiving a retransmission request and a second time of transmitting the second MAC PDU; and
   ignoring the retransmission request based on the difference.

5. The data packaging method of claim 1, wherein the selected portion includes one of a user data unit and a control data unit.

6. A communication device, comprising:
   a buffer;
   a processing circuit;
   a storage circuit, configured to store a program code, to instruct the processing circuit to perform the following steps:
      transmitting a plurality of first medium access control (MAC) protocol data units (PDUs) including a plurality of first radio link control (RLC) PDUs;
      storing the plurality of first RLC PDUs in the buffer;
      obtaining allocated resources for a second MAC PDU;
      inserting content at least one second RLC PDU into the second MAC PDU based on a logical channel prioritization operation;

determining whether any resources remain in the second MAC PDU after the at least one second RLC PDU is inserted into the second MAC PDU based on the logical channel prioritization operation;

selecting a portion from the plurality of first RLC PDUs which are previously transmitted from the buffer and inserting the selected portion into the second MAC PDU in response to any resources remaining in the second MAC PDU after the at least one second RLC PDU is inserted into the second MAC PDU based on the logical channel prioritization operation; and transmitting the second MAC PDU including the at least one second RLC PDU and the selected portion inserted behind the at least one second RLC PDU.

7. The communication device of claim 6, wherein the processing circuit is further configured to perform the following step to select the portion from the plurality of first RLC PDUs:

selecting the portion based on whether the portion is acknowledged.

8. The communication device of claim 6, wherein the plurality of first RLC PDUs includes one or more unacknowledged data units, and the processing circuit is further configured to perform the following step to select the portion of the first RLC PDUs comprises:

selecting an earliest data unit from the one or more unacknowledged data units.

9. The communication device of claim 6, wherein the processing circuit is further configured to perform the following steps:

receiving a retransmission request regarding the selected portion;

determining a difference between a first time of receiving a retransmission request and a second time of transmitting the second MAC PDU; and ignoring the retransmission request based on the difference.

10. The communication device of claim 6, wherein the selected portion includes one of a user data unit and a control data unit.

11. The data packaging method of claim 1, wherein the selected portion is transmitted in the first MAC PDU and retransmitted in the second MAC PDU.

12. The communication device of claim 6, wherein the selected portion is transmitted in the first MAC PDU and retransmitted in the second MAC PDU.

* * * * *